United States Patent
Ajjarapu et al.

(10) Patent No.: US 8,417,581 B2
(45) Date of Patent: Apr. 9, 2013

(54) METHOD, SYSTEM, AND MEDIUM FOR ENABLING A USER TO ACCESS LEARNING CONTENT VIA A SINGLE-WINDOW LEARNER INTERFACE

(75) Inventors: Gopala Ajjarapu, Cupertino, CA (US); Pratap Chillakanti, Fremont, CA (US); Maksim Ustinov, Fremont, CA (US); Kevin Smit, San Carlos, CA (US)

(73) Assignee: Lensoo Inc., San Jose, CA (US)

( * ) Notice: Subject to any disclaimer, the term of this patent is extended or adjusted under 35 U.S.C. 154(b) by 0 days.

(21) Appl. No.: 13/428,687

(22) Filed: Mar. 23, 2012

(65) Prior Publication Data
US 2012/0185358 A1 Jul. 19, 2012

Related U.S. Application Data

(63) Continuation-in-part of application No. 12/939,413, filed on Nov. 4, 2010.

(60) Provisional application No. 61/258,410, filed on Nov. 5, 2009.

(51) Int. Cl.
*G06Q 30/00* (2012.01)

(52) U.S. Cl.
USPC ......... 705/26.1; 705/27.1; 434/107; 434/118; 434/365

(58) Field of Classification Search .................. 705/1.1, 705/26.1–27.2; 434/81, 106, 107, 112, 118, 434/126–130, 154–156, 188, 217, 236, 239, 434/245, 247, 262, 276, 365
See application file for complete search history.

(56) References Cited

U.S. PATENT DOCUMENTS

| | | | |
|---|---|---|---|
| 6,652,287 B1 * | 11/2003 | Strub et al. | 434/365 |
| 2003/0004909 A1 * | 1/2003 | Chauhan et al. | 706/45 |
| 2006/0019222 A1 * | 1/2006 | Lelito et al. | 434/118 |
| 2006/0095514 A1 * | 5/2006 | Wang et al. | 709/204 |
| 2006/0134593 A1 * | 6/2006 | Kalous et al. | 434/350 |
| 2006/0218034 A1 * | 9/2006 | Kelly | 705/11 |
| 2008/0091686 A1 * | 4/2008 | Beard | 707/10 |
| 2008/0213741 A1 * | 9/2008 | Redd et al. | 434/365 |
| 2009/0177535 A1 * | 7/2009 | Vogt et al. | 705/11 |
| 2009/0292625 A1 * | 11/2009 | King et al. | 705/27 |
| 2010/0156913 A1 * | 6/2010 | Ortega et al. | 345/520 |

OTHER PUBLICATIONS www.esi-intl.com. Jun. 15, 2007.[recovered from www.Archive.org].*
www.allexperts.com. Sep. 29, 2008. [recovered from www.Archive.org].*

* cited by examiner

*Primary Examiner* — William Allen
(74) *Attorney, Agent, or Firm* — Pratap Chillakanti

(57) ABSTRACT

Methods and systems are disclosed for providing learning as a service in a learning network. At least certain embodiments connect users with providers of learning content using an online learning marketplace in a web-based user interface that allows users to control content and pace of learning. The learning can be self-directed, through self-paced online courses, as well as live online courses. The platform is configured to fulfill user requests for learning content without regard to location of the content or time of access. The learning content can be decomposed into monetized components, which can be accessed by users on a per-use or per-session basis.

9 Claims, 14 Drawing Sheets

METHOD, SYSTEM, AND MEDIUM FOR ENABLING A USER TO ACCESS LEARNING CONTENT VIA A SINGLE-WINDOW LEARNER INTERFACE

PRIORITY

The present application is a continuation-in-part of U.S. patent application Ser. No. 12/939,413, filed on Nov. 4, 2010, which claims priority to U.S. Provisional Patent Application No. 61/258,410, filed on Nov. 5, 2009, both of which are incorporated herein by reference in their entirety.

FIELD OF THE INVENTION

At least certain embodiments of the invention relate generally to online learning in a network, and particularly to providing learning as a service in an online learning marketplace.

BACKGROUND OF THE INVENTION

Conventional websites and applications provide useful services for people having various needs. For example, for buying and selling there are websites such as eBay and Amazon. For networking there are websites such as LinkedIn, and for social networking there are various websites such as Facebook, Twitter, and YouTube. The need for continuing education is growing. Individuals need to be lifelong learners, constantly upgrading their skills to remain employable. Corporations face the daunting challenge of keeping their global professional employees and partners fully trained while minimizing downtime and managing costs. On the supply side, content providers are under pressure to increase their top line and are always looking for new ways to increase reach as well as provide additional services. In spite of technological advances, the cost of education continues to rise without an increase in effectiveness.

There are numerous online educational institutions such as e-learning companies, learning content providers, learning management systems, and free web content. Each of these has its own disadvantages. For example, e-learning companies and content providers suffer from the fact that they are fragmented and provide their own content instead of providing an open system where any number of content providers can contribute to the educational process. On the other end of the spectrum, are the free web content providers, but these often have very limited mechanisms for allowing users to search for content and lack quality control over the content. Learning management systems are often internally oriented proprietary systems, and suffer from some of the same disadvantages as other e-learning systems.

SUMMARY OF THE DESCRIPTION

Improved methods and systems are disclosed for providing learning as a service in a learning network. At least certain embodiments connect users with providers of pedagogic or professional learning content using an online marketplace. A web-based user interface allows users to interact with the learning network and to control the content and pace of learning. The learning can be self-directed, through self-paced online courses as well as live online classes. A learning platform is provided to receive requests for content and to fulfill those requests without regard to the location of the content or time of access. The content can be decomposed into monetized components, which can be accessed by users on a per-use or per-session basis.

Learning is also facilitated by providing users with online availability of experts, instructors, peers, colleagues, and community members. In one embodiment, the learning platform includes a learning engine coupled with a database of searchable learning content to enable control over the learning content and pace of learning. A web-based user interface window is provided to enable user interaction with the content and the community.

BRIEF DESCRIPTION OF THE DRAWINGS

For a better understanding of at least certain embodiments, reference will be made to the following Detailed Description, which is to be read in conjunction with the accompanying drawings, wherein.

DETAILED DESCRIPTION

Figure 1A:
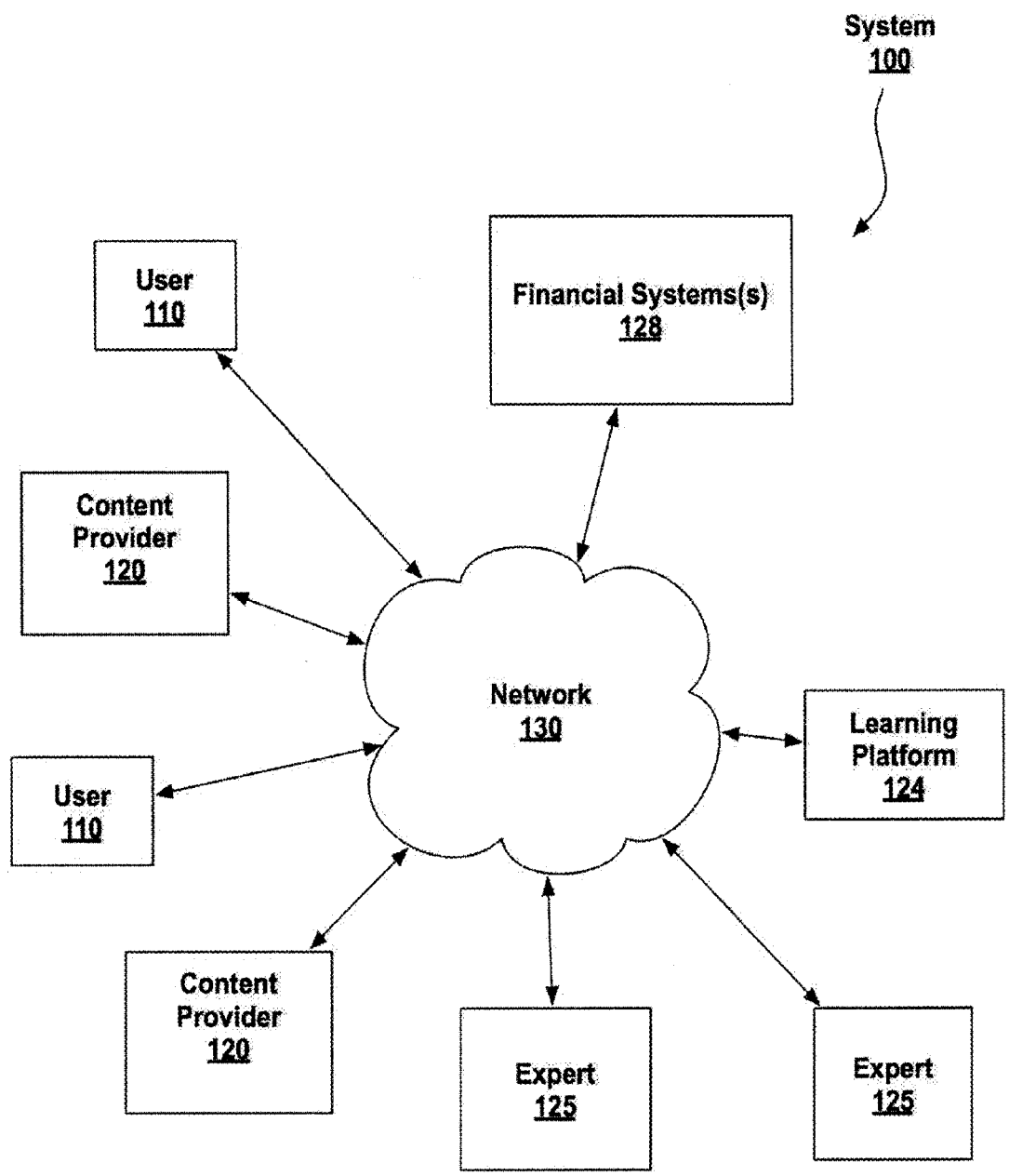
FIG. 1A depicts an illustrative block diagram of a learning network according to one embodiment.

Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of embodiments of the invention.

There are numerous online educational institutions, such as e-learning companies and providers of learning management systems. None of these however offer a go-to-place for self-directed learning or live online classes in an open infrastructure that accepts content in any format or multiple formats, and that decomposes the content into monetizable components to be provided on a per-use or per-session basis.

At least certain embodiments provide a transformative solution combining pedagogy and technology to address learning over a network where the learner, not the teacher, is at the hub and is able to procure learning resources on-demand. As such, these embodiments provide integrated systems that reinforce active learning. As used herein, the term active learning is defined to include a self-directed, expert-guided, community-enabled learning process as well as learning through live online courses. Active learning is learning where the "learner" can interact with content, experts, instructors, and community members or other resources on-demand. In short, active learning can be achieved through integration of rich multimedia content, expert coaching and instruction, and community collaboration.

The advent of the cloud computing model, the prevalence of social media technologies, and the explosion of network bandwidth have made it possible to create a collaborative network for learning in a learning environment where education is affordable, accessible, and effective. By placing the learner at the hub of the learning process, users have the ability to control both the content and pace of learning, and can interact with experts, instructors and peers to facilitate the learning process. Use of collaboration tools is provided to facilitate setting individual learning goals and to allow learners to search for and obtain pedagogic or professional learning content on a per-use or per-session basis. Users are able to receive guidance and feedback from experts in the applicable content. Embodiments also include a real-time collaborative learning environment with integrated networking and socializing opportunities.

Advantages of the various embodiments include: (1) content providers are able to increase their revenue through a global distribution channel, as well as provide additional services such as online use of subject matter experts and establish client relationships for future business; (2) content or subject matter experts are able to monetize their skills; (3) individuals can gain flexibility and learning while ensuring learning outcomes are met at a significantly lower cost than any other method, and also are able to build their networks. Learners are able to learn a skill more efficiently without affecting learning outcomes by taking self-paced courses and interacting with a coach or expert for advice and feedback. It should be noted, however, that the description herein is not limited to self-paced courses, as the option for live educational content is also contemplated within the scope of various embodiments. For instance, as will be discussed in more detail below, live online courses with study groups can also be taken by users within the learner's window. These online classes can be delivered via a video chat window and integrated with other features of the system such as study groups, expert chat sessions, and interacting with the various learning communities.

Content providers are able to significantly increase sales by increasing reach while achieving time and location flexibility. In effect, embodiments disclosed herein allow operators of the learning platform to act as an agent between learners and the content providers, and to provide learning as a service using an on-demand model. Content providers can set prices and will have an agency agreement with the learning platform provider. Content providers may also appoint content experts, and the revenue from these experts may flow to the content provider who would then have a separate financial relationship with the expert. Moreover, the online marketplace for self-directed learning or live online classes can be separated into multiple domains including public domains and private domains. In general, the private domains can have the same functionality as public domains, but may be limited to a designated group of people, such as within a particular enterprise. Enterprises and content providers are able to create their own domains within the public system. In one embodiment, this can be accomplished through cloud-based computing, although the invention is not so limited as other computing models can be used.

FIG. 1A depicts an illustrative block diagram of a learning network according to one embodiment. In the illustrated embodiment, system 100 includes a learning platform 124 connected to multiple user devices 110, content providers 120, and experts 125 via a network 130. The user devices 110 typically include display or other output functionalities to present data exchanged between the device and a user. The user devices may include any hardware configuration that has Internet browser capability. For example, the user devices may be desktop or laptop computers, mobile phones, PDAs or other handheld devices, etc. In addition, network 130 maybe any type of communications network. For example, network 130 may be a telephonic network, an open network such as the Internet, or a private network such as an intranet or extranet. Network 130 may also be a single network or any collection of distinct networks operating wholly or partially in conjunction to provide connectivity to the user devices 110, and may appear as one or more networks. The user devices 110, content providers 120, and experts 125 may be coupled with the network 130 via any connection that supports Internet browsing such as a dial-up connection, digital subscriber loop (DSL, ADSL), cable modem connection, or any other type of connection allowing these devices to communicate with remote servers (e.g., web server, host server, mail server, or instant messaging server) to provide access to the network 130.

System 100 further includes one or more financial systems 128 coupled with the learning platform 124 via network 130. The financial systems 128 can be implemented as hardware or software, or combination thereof, and are configured to communicate with the learning platform 124 to provide billing, collections, and corporate reporting functionality for the learning network. In at least certain embodiments, financial systems 128 are configured to facilitate transactions over the learning network so that users can purchase pedagogic or professional content and related artifacts such as books, digests, or other multimedia. Financial systems 128 may also be configured to facilitate transactions between users and experts, on a per-session basis.

Figure 1B:
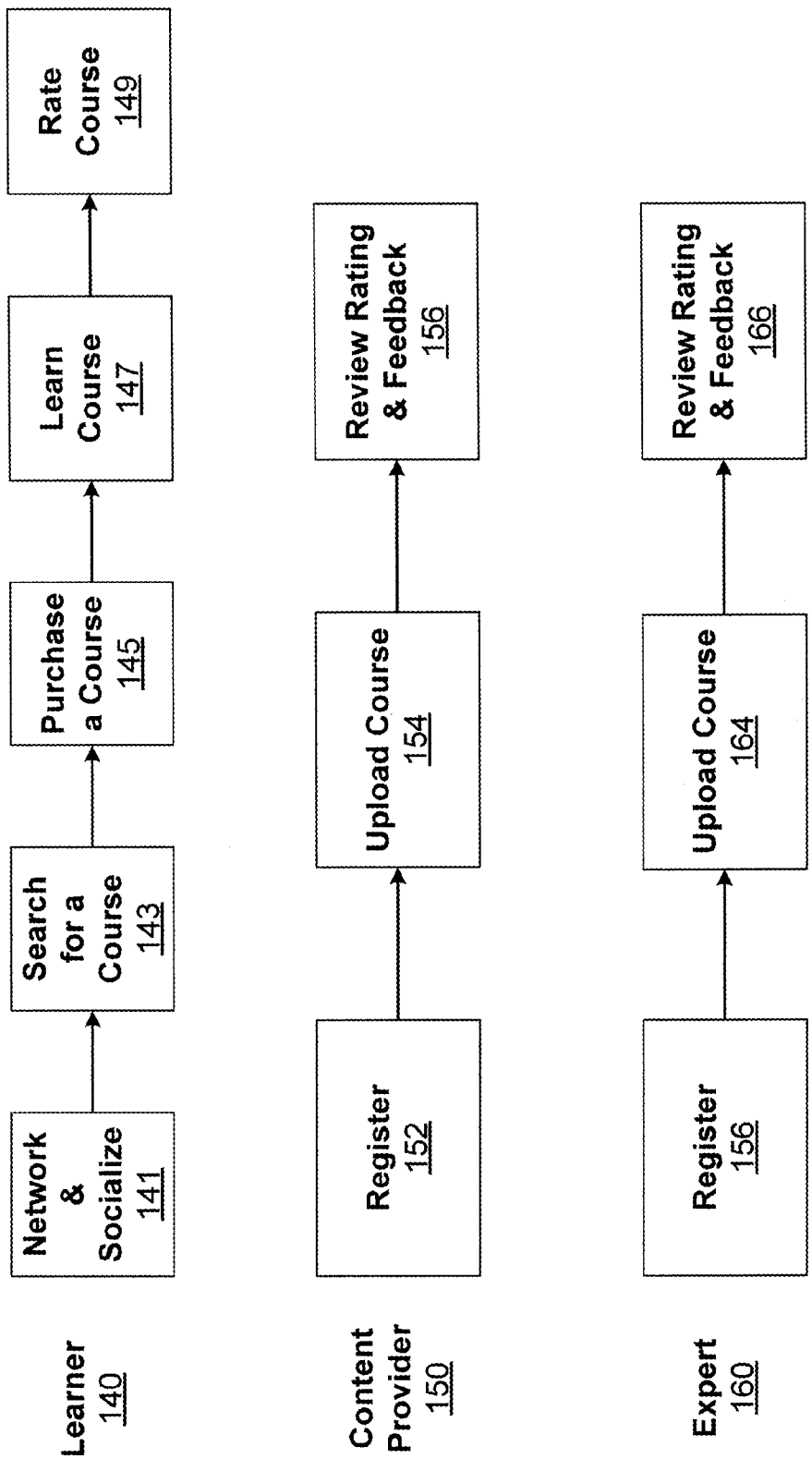
FIG. 1B depicts an illustrative flow chart showing how various users interact with the learning network according to one embodiment.

FIG. 1B depicts an illustrative flow chart showing how various users may interact with the learning network. The illustrated embodiment shows some of the functionality of the learning network and interactions available for users, content providers, and experts. For example, learner 140 can network and socialize 141, search for a course 143, purchase a course 145, learn a particular course 147, and rate the course 149 using the learning network. Content providers 150 can, for example, register their course 152 on the learning network, upload a course 154 to the learning network, and review rating and feedback 156 provided by users of the learning network. Users may also register as an expert 160, upload courses 164, and review rating and feedback 166 provided by users of their expert services. In this way, the learning network described herein provides an online marketplace for self-directed learning or live online classes that integrates learning content, expert and community guidance, networking and feedback all within a single learner's window. From the learner's window, users can choose and learn from among a variety of course categories and topics, take notes, and interface with experts and other community members using chat or email to receive guidance and feedback among other things. Users can also provide feedback on content, experts, and content providers that can be used by other users to determine whether to take a particular course from a particular content provider, or engage with a particular expert. In at least some embodiments, users can also vote on feedback provided by other users.

Figure 2A:
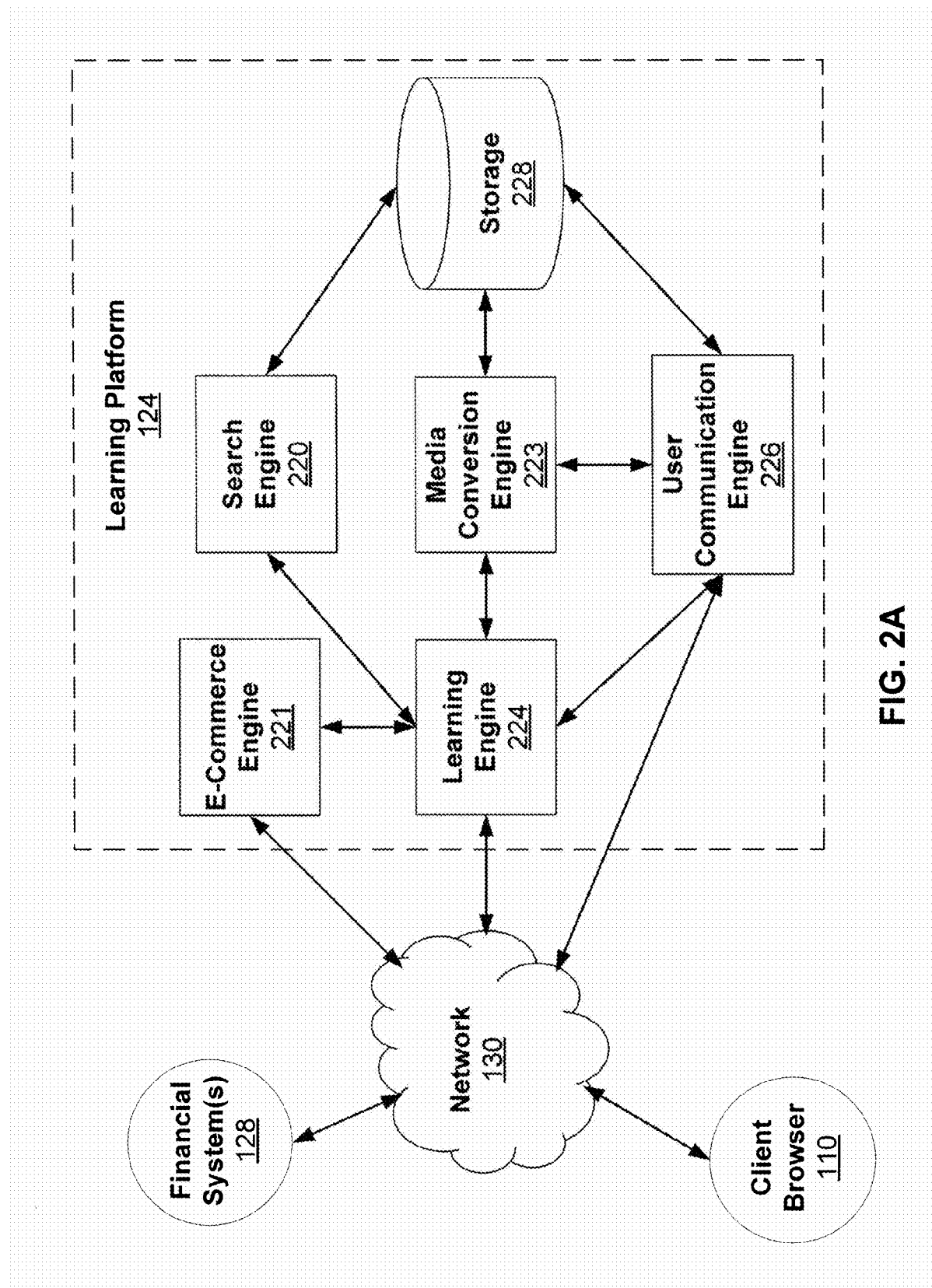
FIG. 2A depicts an illustrative block diagram of the learning platform according to one embodiment.

FIG. 2A depicts an illustrative block diagram of the learning platform 124. In the illustrated embodiment, learning platform 124 includes: (1) user communication engine 226 coupled with network 130; (2) a learning engine 224; (3) a search engine 220; (4) storage 228; (5) a media conversion engine 223; and (6) e-commerce engine 221. User communication engine 226 is configured to connect users of the learning network with providers of pedagogic or professional content using an online marketplace for self-directed learning or live online classes. User communication engine 226 provides communications between a user's client browser 110 and the learning platform 124. Learning engine 224 receives communications from the user client browsers 110 via network 130 and performs the necessary processing of those communications. Learning engine 224 may be implemented as hardware, software, firmware, or any combination thereof including hybrid circuits.

The learning engine 224 provides all the functionality without the users having to store any client software on their local devices. Users can upload and play various content within their local browser. In fact, certain embodiments only require users to have an Internet browser-compatible device that enables them to interface with the learning engine 224 within a single browser window. Learning engine 224 is configured to receive pedagogic or professional content from various content providers and to store that content in storage 228. Learning engine 224 has the ability to perform the following illustrative functionality: (1) upload courses, including multiple modules and sub-modules; (2) provide course summaries, authors, and other course information; (3) assign content experts to various courses; and (4) establish pricing for content and content experts, among other things.

In the illustrated embodiment, learning engine 224 is coupled with search engine 220 to provide responses to users' queries when they desire to search for content within the online marketplace. Searches may be characterized in four major categories: (1) global searching of everything on the learning platform; (2) knowledge base searching of all supporting learning material; (3) course searching from the storage 228; and (4) community searching for specific members by role, name, expertise, etc. As used herein, the term knowledge base refers to a searchable storehouse of information (e.g., white papers, case studies, course catalogs, community boards, FAQs, blogs, etc.) in a particular domain accessible to members of that domain. In the illustrated embodiment, learning engine 224 is further coupled with storage 228 via media conversion engine 223. Storage 228 receives and stores pedagogic or professional content from content providers in a searchable format. In one embodiment, tags are provided to facilitate searching. Additionally, storage 228 includes a cataloging system that consists of categories, subjects, and content (courses). This cataloging system is dynamic, and as the content library increases, courses can be tagged with their respective subject, and additional subjects can be added at any time. Online catalogs are also provided and are searchable by category, subject, author, or content provider. A course can be viewed as a packaged unit of learning. Each course may have a set of one or more modules and each of these modules can have sub-modules. Each course is not limited to a particular type of module format. For example a course may have any number of different formats including video, audio, or document formats, or any combination thereof.

Learning engine 224 is capable of essentially decomposing the learning process into its components and to use technology to reassemble them into monetizable units that can be separately priced. This facilitates self-directed learning or live online classes by enabling each learner to purchase various components of the learning process separately, to store them in the learning platform 124, and to interact with the content in a self-paced, on-demand manner. That is, the components of the learning process can be broken down so as to allow the learner, not the instructor or content provider, to direct the time, place, and manner of learning. The users essentially have remote control over the learning process. Media conversion engine 223 operates in conjunction with learning engine 224 to facilitate this aspect of the learning process.

Media conversion engine 223 can be configured to provide requested content to users in their client browsers 110 regardless of the format of the content. Media conversion engine 223 can convert various formats of content stored in storage 228 into content having a format compatible with that user's client browser 110. For example, if a user client browser 110 operates using an Apple Macintosh or other Macintosh-compatible computer or device, media conversion engine 223 can convert the content stored in storage 228 into a format compatible with that particular computer or device. In addition, media conversion engine 223 can convert between video, audio, and text within documents upon user request, or if a particular media format is not compatible with the user's client browser. For client browsers 110 that do not support a particular media content, media conversion engine 223 can nevertheless convert that media content into a format compatible with any client browser 110. For example, at least certain embodiments are compatible with the Google Web Toolkit (GWT), which is an open source set of tools that allows web developers to create and maintain complex JavaScript front-and applications in Java.

Storage 228 includes a learner's vault database configured as a personal storage system for user data such as notes, chat sessions, and other information specific to a particular user. The notes and chat sessions can be time-stamped, searchable, and are linked to particular content allowing users to reference that content at the specific place in the course where the particular note was taken or chat session was initiated. Chat is a collaboration functionality which is available to learners and can be text, audio, or video format, including live video chat. Embodiments that have the live video chat feature include, but are not limited to, "ask an expert" and study group chat sessions.

Storage 228 also includes a profile database configured to store user profile data. Users can create a profile that includes name, address, etc. Once a user signs up for the learning service, that user will create a profile, which can then be stored in the profile database 234. The definition of user includes learners, content providers, and experts as depicted, for example, in FIG. 1B. That is, users can be strictly learners, administrators of content providers, or identified as experts. An expert is a specific role which a user must be qualified to perform. There are two types of experts: content experts and subject matter experts. Content experts are associated with a particular pedagogic or professional content provided by a particular content provider. Such content experts can be utilized as a resource for collaborative learning. Users taking a particular course can search for content experts associated with a particular course, and can ask questions using chat or e-mail and receive guidance and feedback from those experts. Experts are generally pre-screened by the content provider, and therefore, verification of their credentials may not be necessary in all cases. Subject matter experts, on the other hand, are experts associated with a particular subject matter, and not necessarily with a particular course or content provider. At least certain embodiments, subject matter experts must be verified by submitting their credentials and requesting to be associated with a particular pedagogic or professional content.

Once a user's credentials have been verified to meet a standard for the particular subject matter, that user can be listed as a subject matter expert, and will henceforth appear in search results for that subject matter. Subject matter experts can be utilized as a resource for learning in the same way as content experts, and they are searchable through the system based on their credentials and corresponding subject matter. In addition, learners can provide feedback on each subject matter expert, based on their experience with that expert. This feedback is collected over time and is used to rate the quality and effectiveness of experts. Unlike content experts, however, subject matter experts are generally engaged directly by the user and do not involve the content providers. As such, engaging a subject matter expert generally requires a separate agreement between the expert and learner. This allows the expert to monetize their expertise in the subject matter in much the same way as the content.

Finally, learning platform 124 further includes an e-commerce engine 221 coupled with one or more financial systems 128 via network 130. The e-commerce engine 221 can be implemented as hardware or software, or combination thereof, including a hybrid circuit; and is configured to communicate with financial systems 128 to provide billing, collections, and corporate reporting functionality for the learning platform 124. In at least certain embodiments, e-commerce engine 221 is configured to work with the financial systems 128 to facilitate transactions over the learning network.

Figure 2B:
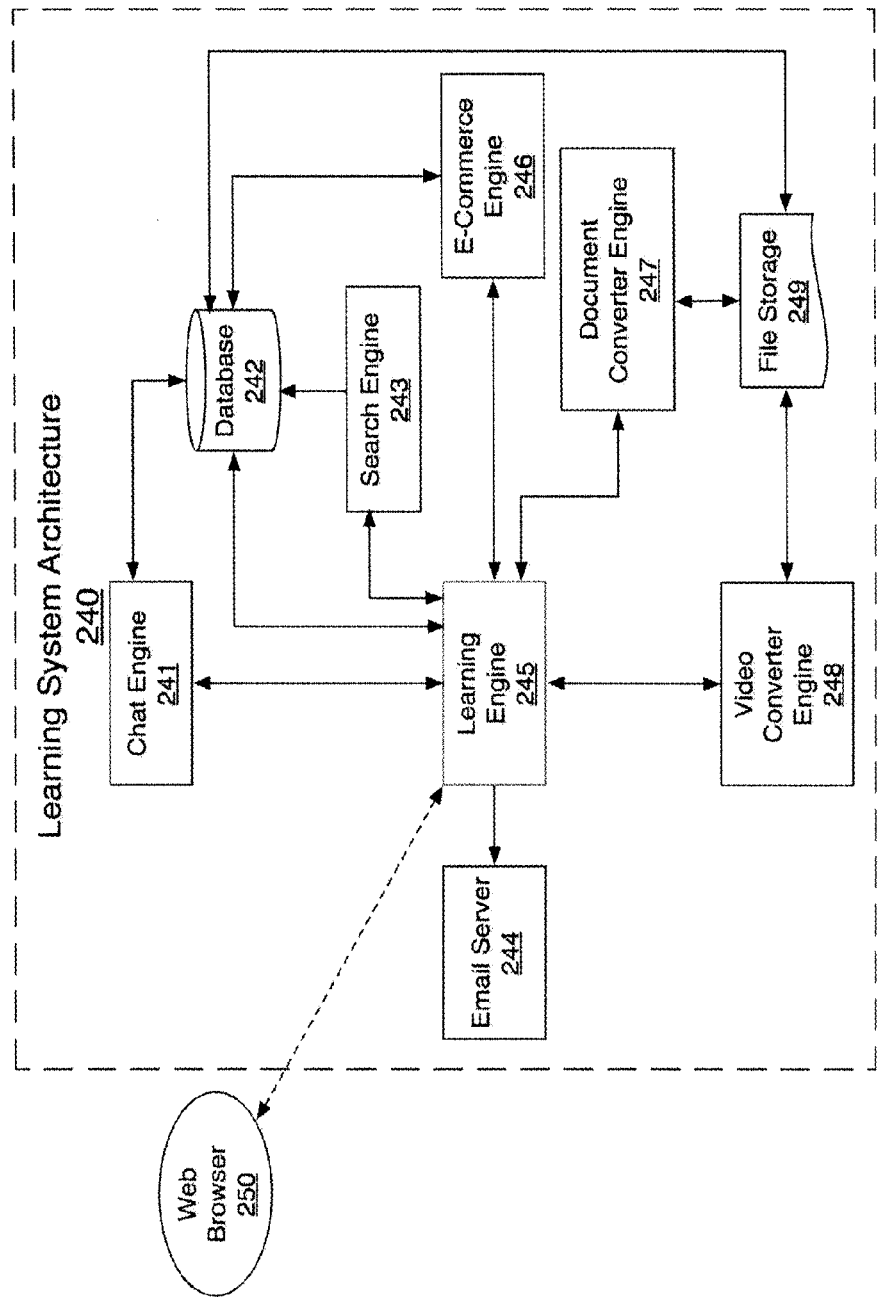
FIG. 2B depicts an illustrative block diagram of the system architecture of the learning platform according to one embodiment.

FIG. 2B depicts an illustrative block diagram of the system architecture of the learning platform according to one embodiment. In the illustrated embodiment, learning system architecture 240 includes a learning engine 245, database 242, e-commerce engine 246, search engine 243, e-mail server 244, chat engine 241, document converter engine 247, video converter engine 248, and file storage 249. Learning engine 245 can connect users of the learning network with providers of pedagogic or professional content using an online marketplace for self-directed learning or live online classes. Learning engine 245 provides communications between a user's web browser 250 and the other components of the learning system architecture 240. Learning engine 245 may be implemented as hardware, software, firmware, or any combination thereof including hybrid circuits.

In at least certain embodiments, learning engine 245 receives communications from the user web browsers 250 via a network or other connection; and performs the necessary processing of those communications. Learning engine 245 is coupled with database 242. Learning engine 245 is configured to receive pedagogic or professional content from various content providers (not shown) and to store that content in database 242. Learning engine 245 is also coupled with e-mail server 244 and chat engine 241 to facilitate chat, including live video chat, as well as email exchanges among users, community members, content providers, and experts. Chat engine 241 is also coupled with database 242. Chat engine 241 provides chat sessions and updates user data accordingly, storing it back to user database 242. E-mail server 244 is coupled with learning engine 245. E-mail server 244 is configured to provide e-mail functionality to facilitate email exchanges among users, community members, content providers and experts.

In the illustrated embodiment, learning engine 224 is coupled with search engine 243 to provide responses to users' queries when they desire to search for content within the online marketplace. Database 242 receives and stores pedagogic or professional content from content providers in searchable format. Learning system architecture 240 includes file storage 249 coupled with database 242. File storage 249 can be configured to provide files of various formats to users via the learning engine 245. As such, learning engine 245 is further coupled with video converter engine 248 and document converter engine 247. As discussed above, users have remote control over their learning process. Video converter engine 248 and document converter engine 247 operate in conjunction with learning engine 245 to facilitate the learning process, and to convert between various media formats upon request of the user, to facilitate network bandwidth, or to address compatibility issues with users' web browsers 250, etc. Video converter engine 248 converts between video file formats and any other media format, including documents and text. Similarly, document converter engine 247 converts between document file formats and any other media format including video and audio. In addition, document converter engine 247 converts among different formats of documents to maintain compatibility with users web browsers 250, etc. In any event, the combination of document converter engine 247 and video converter engine 248 is operable to provide requested content to users in their client browsers 250 regardless of the format of the content and regardless of the format utilized by a particular user's web browser 250.

Database 242 includes a personal storage system for user data such as notes, chat sessions, and other information specific to a particular user. Database 242 also includes a profile database configured to store user profile data.

Finally, learning platform 124 further includes an e-commerce engine 246 coupled with one or more financial systems 128 (not shown) via any network. The e-commerce engine 246 can be implemented as hardware or software, or combination thereof, including a hybrid circuit; and is configured to communicate with financial systems to provide billing, collections, and corporate reporting functionality for the learning system architecture 240. In at least certain embodiments, e-commerce engine 246 is configured to work to facilitate transactions over the learning network.

Figure 3:
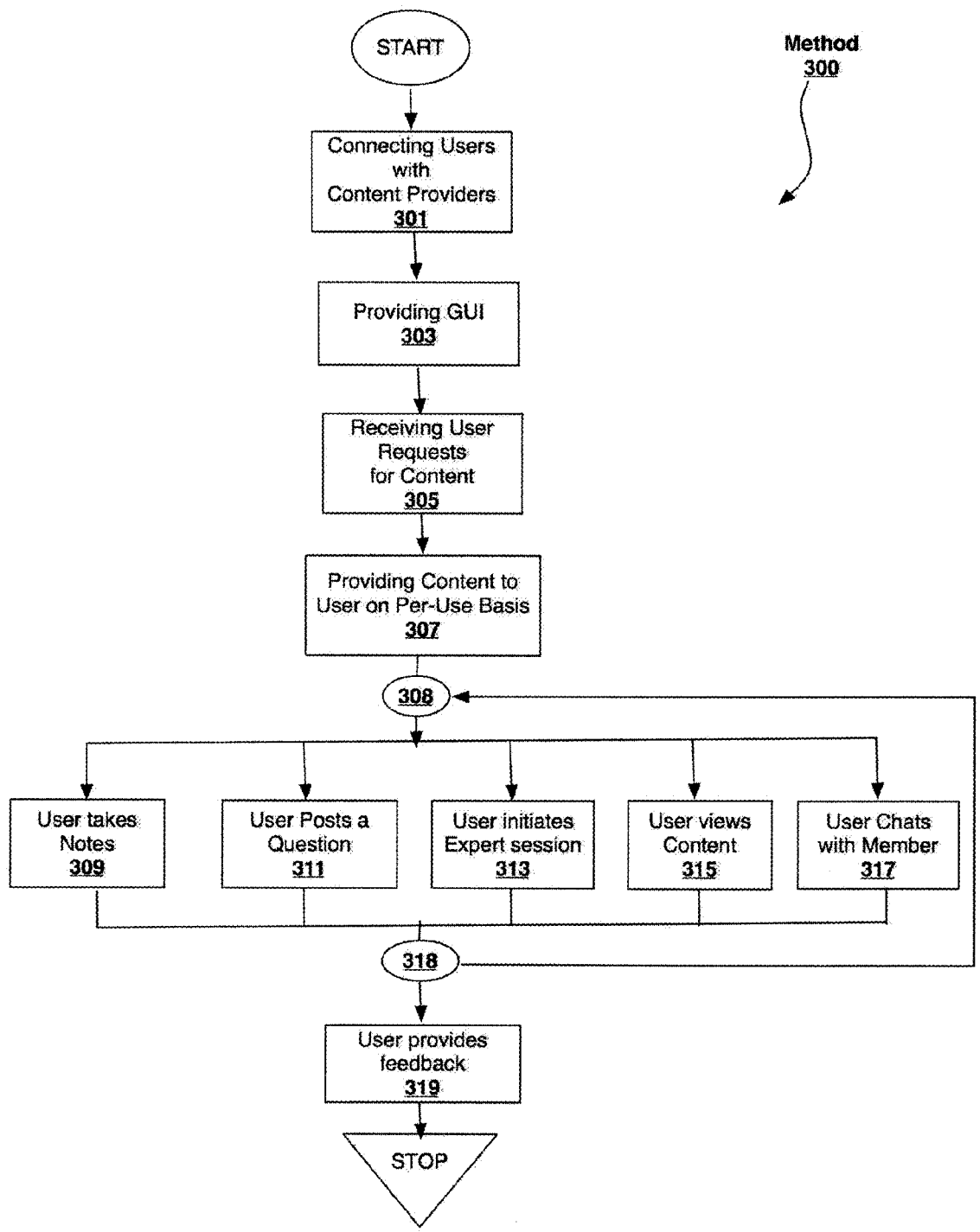
FIG. 3 depicts an illustrative process of providing learning as a service in a learning network according to one embodiment.

FIG. 3 depicts an illustrative process of providing learning as a service in a learning network. Method 300 begins at operation 301 where users are connected with providers of pedagogic or professional content using the learning network to facilitate the creation of an online marketplace for self-directed learning or live online classes. The learning platform, at operation 303, then provides the user with a web-based user interface in a single learning window that allows the user to interact with the content without regard to time of access or location of that content, and to allow users to control both the content and pace of learning. From the single learning window, users can search for and request content from the learning platform (operation 305), and the learning platform responds by providing the requested content to the user on a per-use or per-session basis (operation 307). As discussed above, users interact with learning system through a single user window. At operation 308, users can take notes in the learner's window (operation 309), post a question to the community or an expert (operation 311), initiated expert session (operation 313), view content (operation 315), or chat with other members of the community or experts (operation 317). For example, users may view content, take notes, post questions to other community members, and initiate a request session with an expert, as examples, to enhance their learning process through self-direction. Users have control over the learning process, including what the users desire to learn, who the users desire to interact with to facilitate the learning, and the pace at which the user desires to learn. In addition, users may additionally provide feedback on content as well as on the expert (operation 319). This completes method 300 according the illustrated embodiment.

Figure 4:
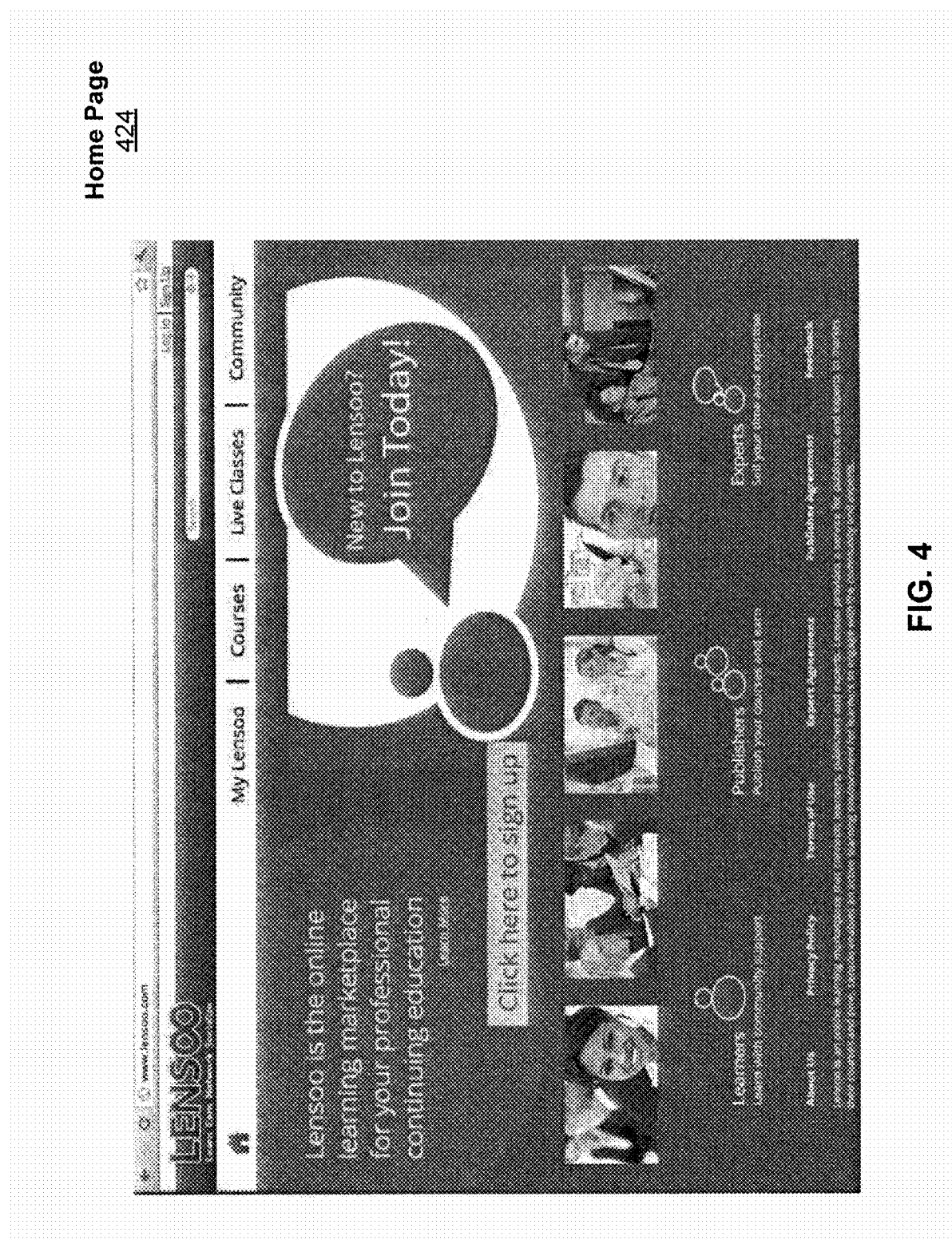
FIG. 4 depicts an example screenshot of a homepage within a user interface according to one embodiment.

FIG. 4 depicts a screenshot of a homepage within the user interface. In the illustrated embodiment, homepage 424 allows a user to preview courses, and to access various other aspects of the learning platform including accessing the learner's window and various community groups. When a user has registered to become a member of the learning network, the user is taken to the homepage which can be customized by the user. The homepage can have a default of home but can also include the following functionality: learning hub (browse for courses); manage profile (edit profile to request changes to rules); community (network and socialize); content provider (upload, modify courses, content feedback, content provider reports, etc.); content or subject matter experts (ask an expert response gadget, expert feedback, expert measurement reports); and system administrator tools. In addition, the homepage includes notifications to the user from community members, responses from experts; chat responses; and question responses.

Figure 5A:
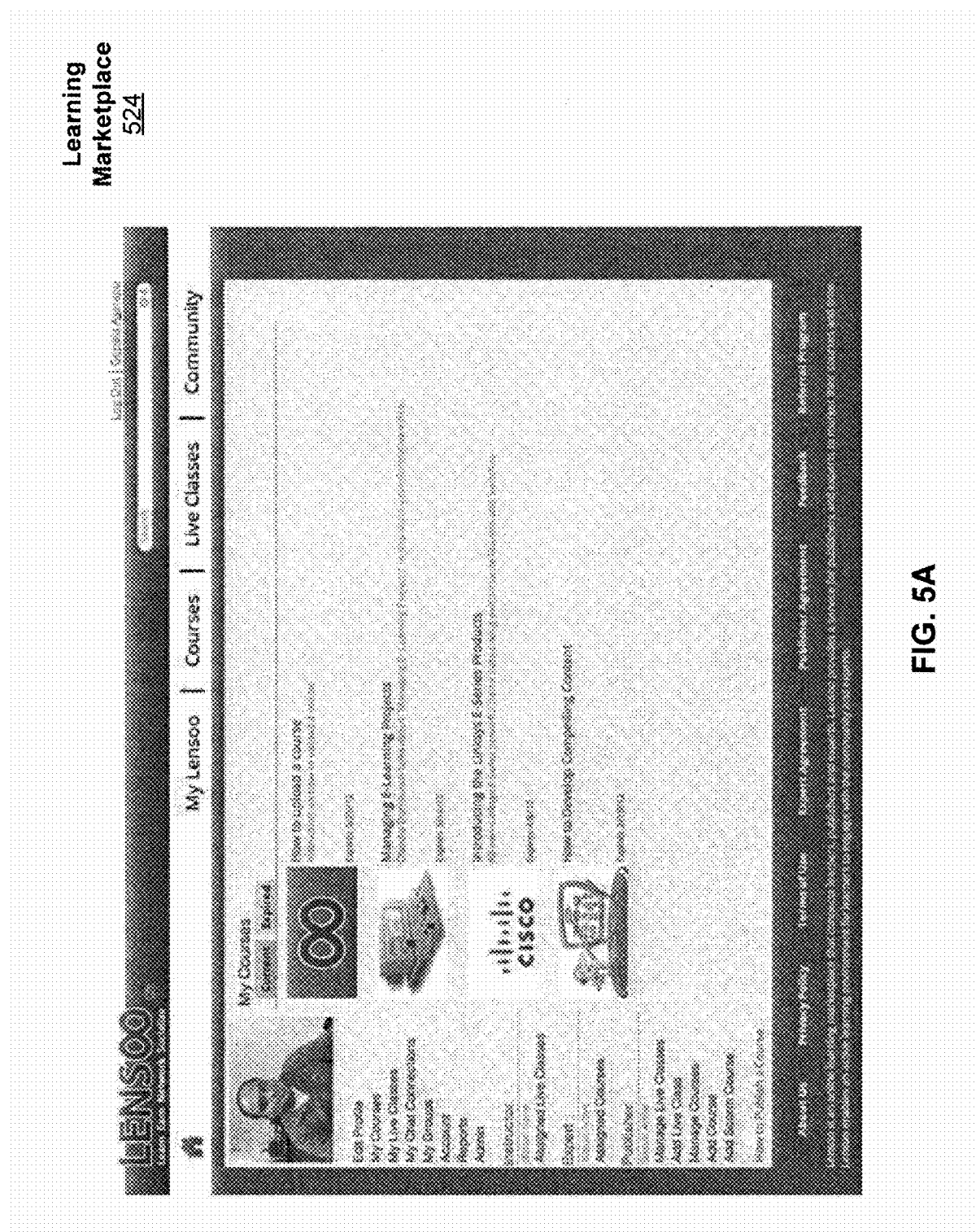
FIG. 5A depicts an example screenshot of an online learning marketplace according to one embodiment.
Figure 5B:
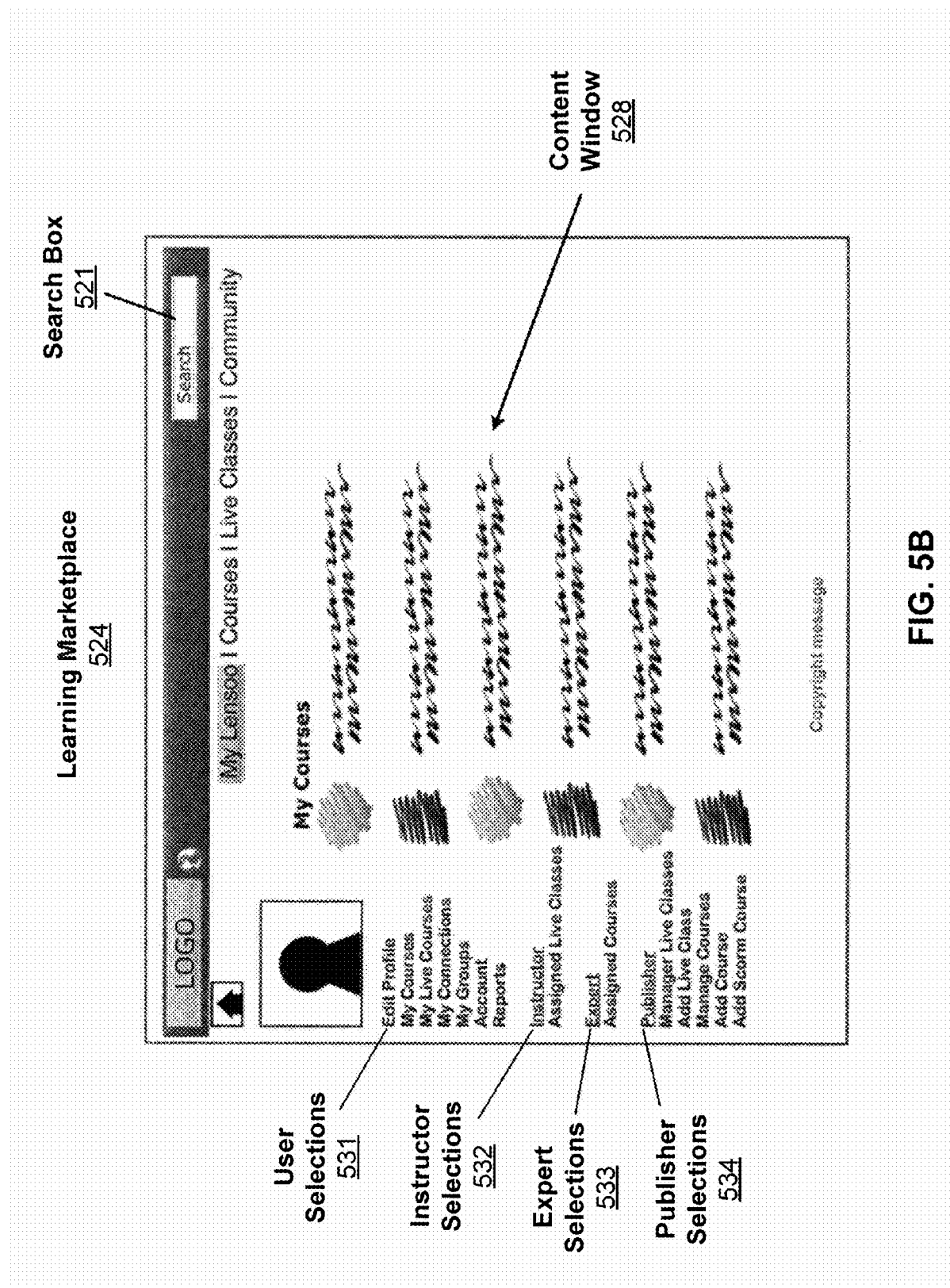
FIG. 5B depicts a diagram of an online learning marketplace according to an illustrative embodiment.

FIGS. 5A-5B depict embodiments of an online learning marketplace. The learning marketplace can be used for self-directed learning as well as for live online courses. In the illustrated embodiment, online learning marketplace 524 allows users to preview courses (featured courses, new courses, top courses, or courses by subject area), and navigate the content from various content providers. The online learning marketplace includes tabs for learners to better manage their classes, both self-paced as well as live online classes. Users can designate themselves as "instructors" to teach one or more of the live online classes. A content publisher is also provided that has the ability to add live classes. Other embodiments include detailed course listings. The detailed course listings can include a brief description of the course, various learner reviews of the course, and the price for that particular course. In addition, the detailed course listing allows users to search and contact certified content experts for the course.

From this window, users can view and edit their profile information, update course selections, connections, and groups, as well as manage account information with user selections 531. Users can also add live online classes for which they are designated as instructors with selections 532. Experts and assigned expert courses can also be managed using selections 533. Users can further publish courses using selections 534. A listing of courses can then be shown in content window 528 according to users' selections. The online learning marketplace also has a search box 521 that can perform queries by users of content, instructors, experts, or publishers.

Figure 6A:
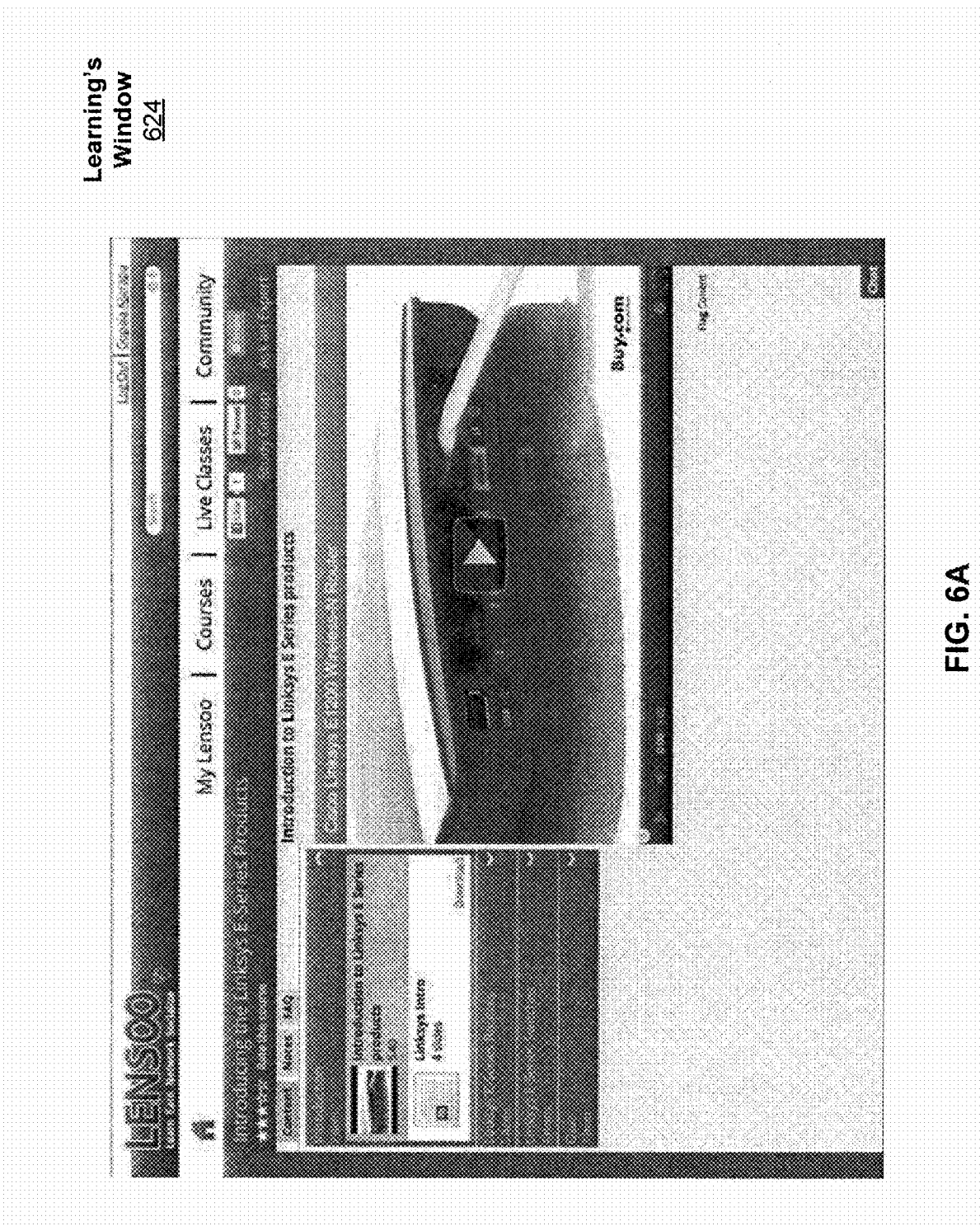
FIG. 6A depicts an example screenshot of a learner's window according to one embodiment.
Figure 6B:
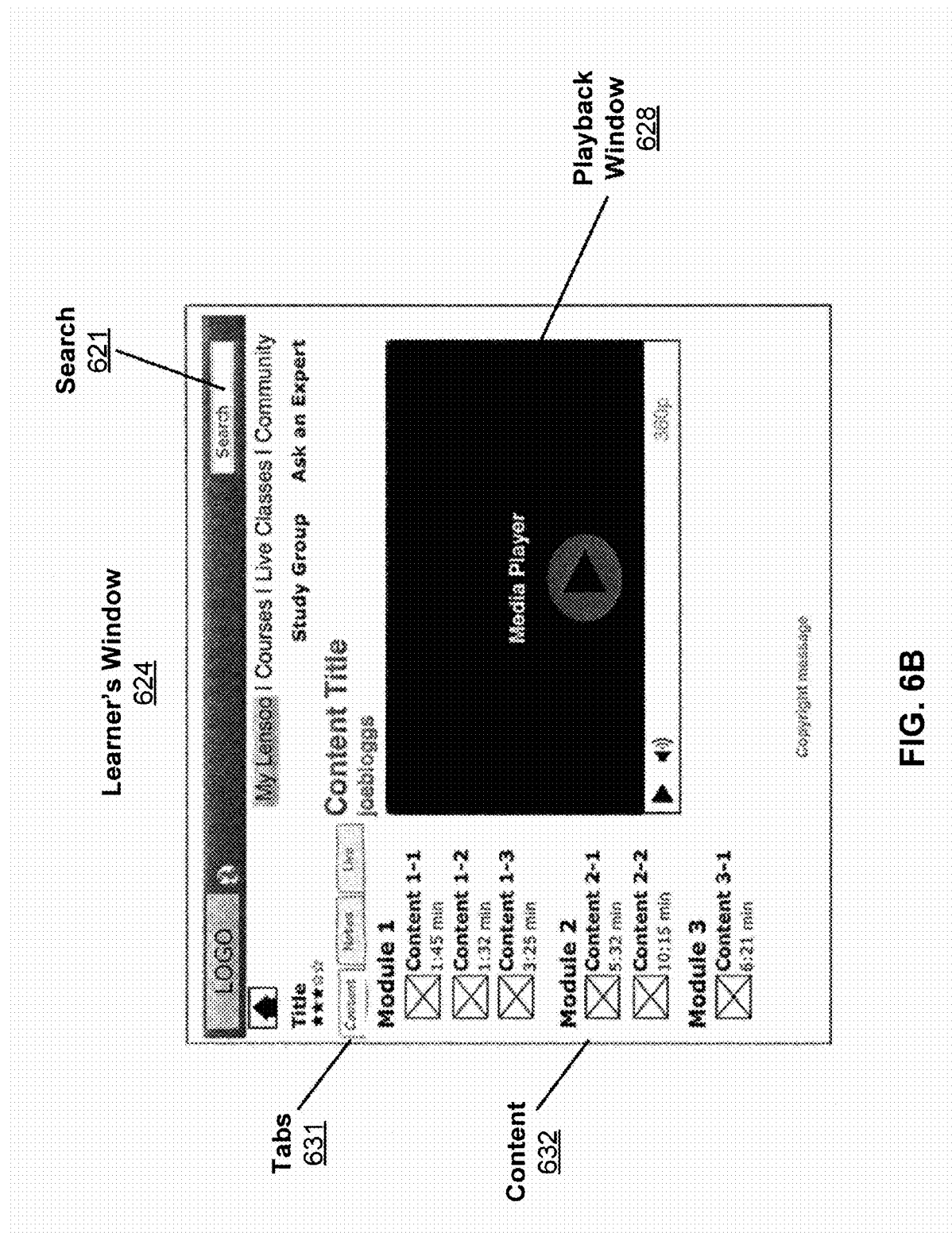
FIG. 6B depicts a diagram of a learner's window according to an illustrative embodiment.

FIG. 6A-6B depict embodiments of a "learner's window" within the user interface. In the illustrated embodiment, learner's window 624 is shown as a web-based user interface with a single window. The learner's window is where a user can engage the active learning system by taking a course, chatting with community members, instructing a live online course, interfacing with one or more experts, posting questions, taking notes, etc. In the learner's window, a user can also view any module, take notes, chat with a contact, and request an expert session, or post a question to the community. In this example, learner's window 624 includes tabs 631 that can be used to select between stored and live online content. Content can be selected using content tabs 632. The selected content can then be viewed in the playback window 628. The learner's window 624 also includes a search box 621 to perform searches of content.

From the learner's window, the learner is also able to navigate the content of a course and choose the appropriate starting point. After the learner has viewed a course, the next time the course is opened, the learner can go directly to the point where he or she left off. The learner is further able to take tests based on the subject matter, where there is functionality for the results to be posted on a user dashboard or other mechanism or device that tracks user progress. Additionally, the course and its associated notes can be saved by the user as desired in the learner's vault database. Learniners can download content in any format, view that content and modify it as it fits the users' convenience. But in at least certain embodiments, this ability to download is under the control of the content provider.

Figure 7A:
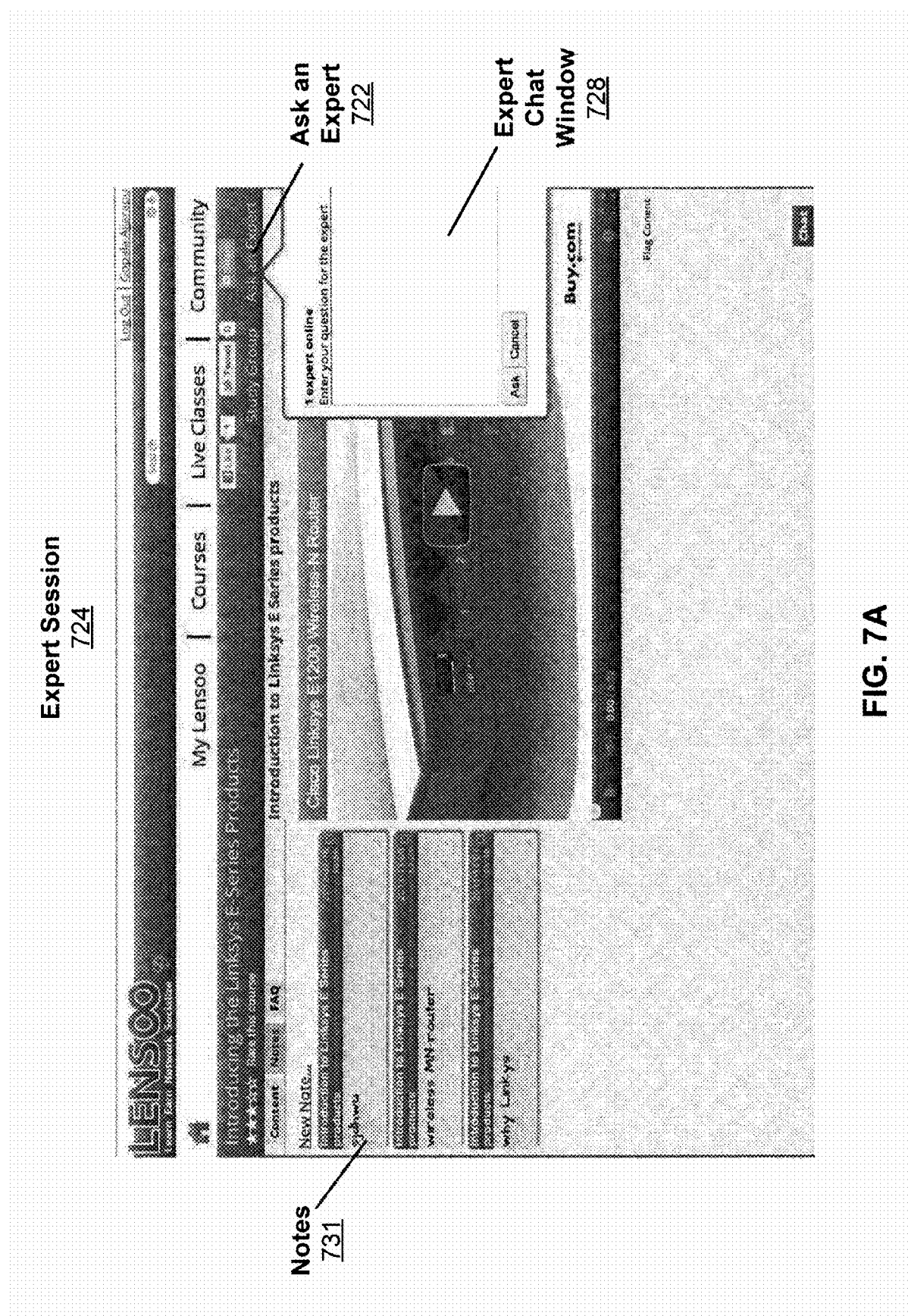
FIG. 7A depicts an example screenshot of an expert chat session within the learner's window according to one embodiment.
Figure 7B:
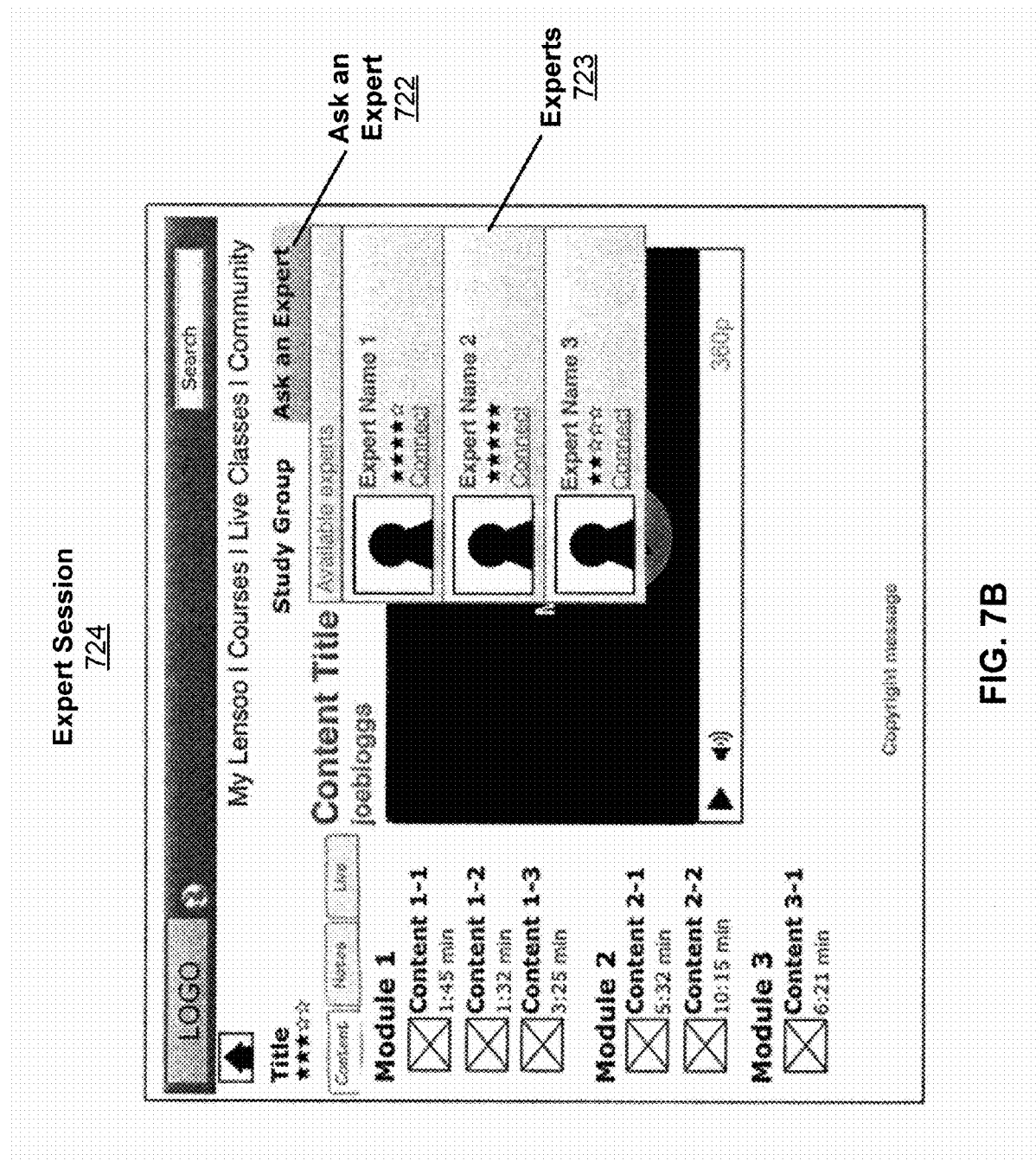
FIG. 7B depicts a diagram of an expert chat session within the learner's window according to one embodiment.

FIGS. 7A-7B depict embodiments of an expert chat session within the learner's window. Embodiments include the ability to engage with subject matter experts that is integrated into the learner's window. A live expert chat session 724 can be initiated by clicking on the "Ask and Expert" tab 722 in the learner's window. The expert chat sessions 724 can be delivered through live video chat. Users can initiate expert chat sessions to seek expert advice from within the learner's window itself. When tab 722 is selected, a list of relevant experts 723 tied to the particular subject matter is displayed. The context of the subject matter can be set within a particular session using the search query or by selection of particular content within the learner's window as shown in FIGS. 6A-6B. The system is configured to search for relevant experts who are available and willing to engage with a user on the particular subject matter, and those experts will be listed a experts 723 that can then be selected for engagement. Users can also type in a question in the expert chat window 728 to be sent to the expert for response.

When the "Ask an Expert" tab 722 is selected, a list of all available experts with the ratings and numbers of learners providing the ratings are displayed. In certain embodiments, the list can be displayed together with the expert's pricing for a 10-minute session. The experts 723 can be listed in any order. In a preferred embodiment, experts 723 are listed according to relevance to the subject matter. In other embodiments, experts can be listed in order of individual ratings by users. A drop down menu list of experts 723 is provided with a maximum of 10 experts shown, as well as a "next available" button to access additional experts. Clicking on the name of an expert takes a user to a webpage which will display the profile of the expert, including their qualifications and credentials.

Once a user has made a selection of a particular expert, a check can be performed to ensure sufficient funds are available for interacting with that expert. Pre-paid course credits are available for users, and can be added to a user's account and stored in the learner's vault database. If there is not sufficient credit for the expert session, the user can be sent to the e-commerce engine (discussed above) to conduct a financial transaction. When the expert and the learner connect, the amount of funds or credits can be automatically deducted from the user's account. Users may also rate the expert and provide feedback. The time period during which the expert works on a user's request is generally determined by the expert and a visual cue is provided to the learner of the time being spent by the expert. If more than a 10-minute session is required, there is a feature in the expert chat for learner to pay for additional 10-minute sessions without terminating the current session. It should be noted that current implementation is a 10-minute session, but the invention is not so limited, as a higher or lower increment of time may be used. Experts can also be rated by users over time and displayed with each expert 723 in the learner's window.

These embodiments allow users to engage with experts or study groups as desired. Students can study, take notes, read frequently asked questions, or participate in study groups with other students who are enrolled in the class at the same time as well as chat with others or ask an expert for assistance. Users can join and interact with study groups within the learner's window. The study group feature is integrated into the courses themselves. All of these features can be included in a single learner's window which is one of the advantages of the embodiments disclosed herein.

In addition, time-stamped, searchable notes can also be used by selecting the notes tab 731 in the learner's window as shown in FIG. 7A. The illustration shows the use of "sticky notes," which means that the searchable notes can be linked to specific content at the time the note was taken (as given by the timestamp). They are termed "sticky" because, when selected by user, they are configured to bring up the linked content in the display window corresponding to that particular note. Content is also linked in the same manner for expert chat sessions or study groups.

Figure 8A:
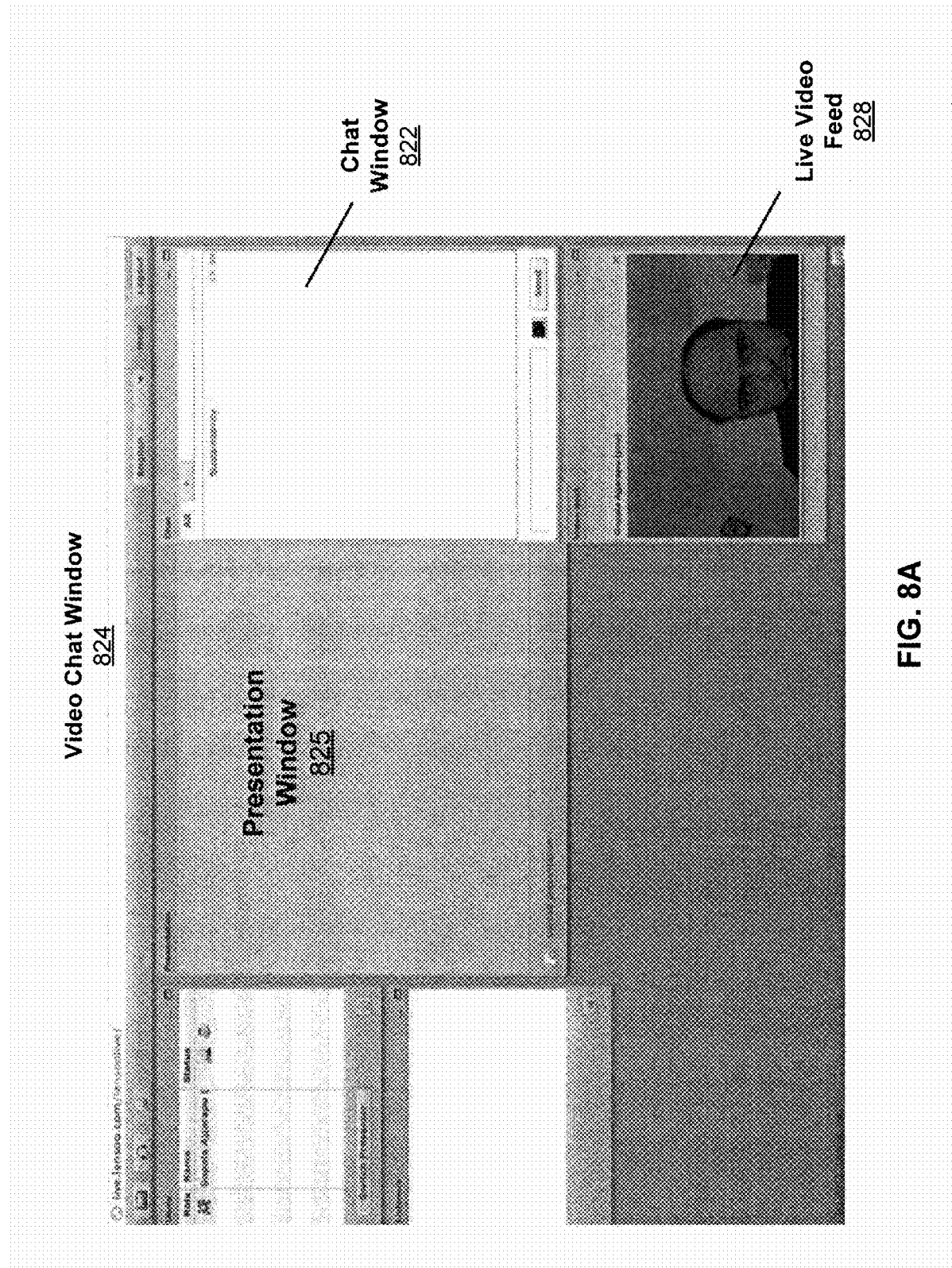
FIG. 8A depicts an example screenshot of a video chat window according to an illustrative embodiment.
Figure 8B:
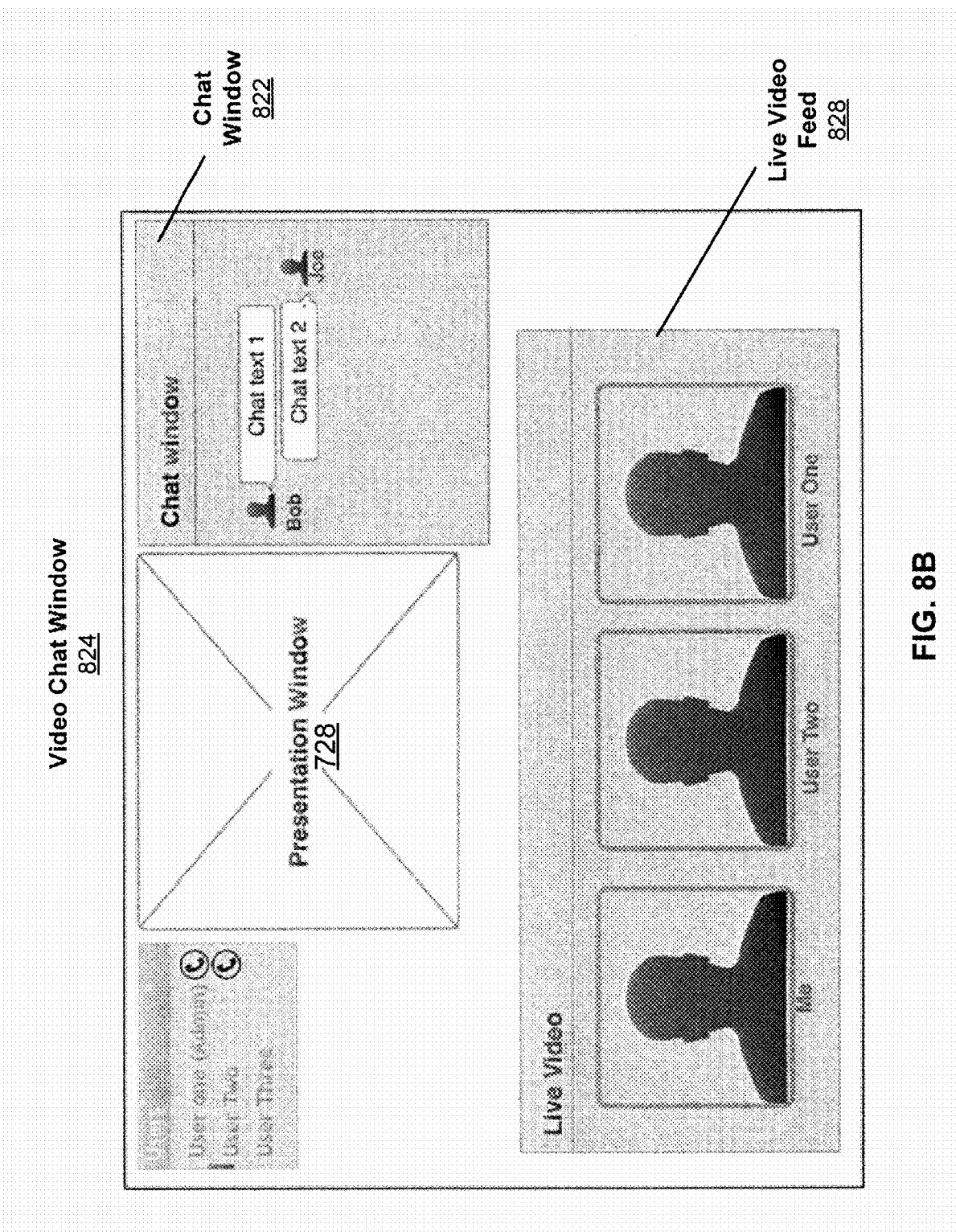
FIG. 8B depicts a diagram of a video chat window according to one embodiment.

The learning platform provides group members with the ability to join in group discussions and interact with other users. For instance, a tab can be provided (not shown) where learners can select to directly engage in group discussions. In one embodiment, the discussions are part of a live video chat session. FIGS. 8A-8B depict an embodiment of a video chat window. In at least certain embodiments, the live video chat window 824 can be used for study group discussions, expert chat sessions, and live online classes or presentations. In the illustrated embodiments, video chat window 824 includes a chat window 822 for chat text entry and display. Video chat window also includes a live video feed window 828 and a presentation window 825 for interacting with other members and integrating presentations and sharing of documents among participants. A user uploading a document can highlight, make comments or revisions, and engage in multiple conversations with all other participants.

Users can join group discussions including community groups or study groups. Users can also ask an expert and participate with the expert in live video chat. Or users can do both simultaneously. Users can also schedule and attend live online classes, which can be stored for later use within the system for self-paced students or for study purposes. Live online courses can be found using the search box within the learner's window or by browsing online content. Courses can then be uploaded and scheduled. The live online classes can then be observed in the video chat window at the scheduled time. As discussed above, study groups can be integrated into the live online courses and offered to users to participate. In addition, instructors can also participate in the live discussions, both during the live online course and afterward as desired.

Other embodiments include a community window (not shown) within the user interface. The community window can include various tabs showing community events, community contacts, community blogs, as well as posted questions within the community and the ability to respond to them. The idea of community includes networking and socializing. In addition to being a member of the learning platform, a user may belong to a subject-based learning community or other business groups sponsored by businesses. A user may also belong to multiple communities. Learners can automatically join communities of interest, and these communities (or learning groups) are tied to a particular learning subject matter and category. Groups of like-minded individuals can be defined within the context of the particular subject matter and these groups become learning groups driven by learning categories and context. Embodiments are configured to tie together learning communities, groups, and categories for group learning and interaction. Experts and instructors of online courses are also members of their respective learning communities. Users can browse learning subject matter by category and join groups according to their needs and interests. Users can also create their own groups based on interests.

Group members can also make their profiles available on the system as well as view other member's profiles and connect with them. This is all integrated together within the learning platform. A networking page may to be provided that includes, for example: (1) public profile of other community members, experts, businesses and business members; (2) ability to request connection through e-mail or live video chat; (3) public events related to the community; (4) post a question or ask an expert within that particular community; or (5) community blogging. For socializing, there'll also be a socializing page which will allow sharing of information, such as pictures, notes, etc. The learning platform provides collaboration amongst learners, instructors, content providers, and experts. This collaboration can be real-time or driven by email.

Since networking is a key element of the learning platform, establishing reputation for members of a particular community is important. As such, a rating and rewards system can be developed that offers rewards for contributing to building of the community. Reputation points may be given to individuals for contributing to building of the knowledge base in the community by performing functions such as posting a question, answering a question, ratings based on the quality of answers, or joining the community. Reputation points could also be made available for providing ratings for instructors, courses, and for experts within a particular community. Different statuses can be attributed to members who collect a particular number of reputation points such as designations of mentor or guru.

The description of the embodiments described herein provide for learning as a service in a learning network. The various data processing devices and systems that can be used with these embodiments are given for illustrative purposes only, and are not intended to represent any particular architecture or manner of interconnecting the components, as such details are not germane to the invention. It will be appreciated that network computers and other data processing systems, which have fewer components or perhaps more components, may also be used. These data processing systems may be any device which interacts with the Internet via a web browser such as, for example, workstations, personal computers (PCs) Apple Macintosh computers, or any other mobile communications device such as an Android, iPhone, iPad, or Blackberry device, for example.

Additionally, data processing devices used to implement the techniques described herein may be specially constructed for specific purposes such as hardwired circuitry, or they may comprise general purpose computers selectively activated or configured by a computer program stored in a memory. Such a computer programs may be stored in an article of manufacture referred to as a computer-readable medium. A computer-readable medium can be used to store software instructions, which when executed by any data processing system, cause it to perform the various methods of this description. Computer-readable media may include any mechanism that provides information in an electronic format accessible by a computer such as a desktop or laptop computer, network device, PDA, or any other device having a set of one or more processors. For example, computer-readable media may include any type of disk including floppy disks, hard drive disks (HDDs), solid-state devices (SSDs), optical disks, CD-ROMs, magnetic-optical disks, ROMs, RAMs, EPROMs, EEPROMs, other flash memory, magnetic or optical cards, or any other type of media suitable for storing instructions in an electronic format.

What is claimed is:

1. A system for providing learning content, comprising:
a learning platform comprising a hardware-based learning engine and a database of learning content;
a network configured to connect at least one user device associated with a user to the learning platform;
a hardware-based financial system coupled with the learning platform via the network, the financial system configured to facilitate the purchase of learning content from the database of learning content;
a single-window learner interface, the learner interface configured to enable user interaction with purchased learning content without regard to time of access or location of the purchased learning content, and to allow the user to control the pace of learning;
wherein the learner interface comprises:
(a) at least one playback window configured to provide the purchased learning content to the user;
(b) at least one note tab configured to facilitate creation of at least one sticky note by the user, the at least one sticky note comprising a time stamped note linked to specific content within the purchased learning content at the time the note was created;
(c) a link to at least one study group specific to the purchased learning content, the link to the at least one study group enabling the user to access at least one study group specific to the purchased learning content for communication with other users in the at least one study group;
(d) at least one expert tab configured to allow the user to engage with an expert, wherein, responsive to the selection of the expert tab, the learning interface is configured to:
(i) present a list of one or more relevant experts tied to the purchased learning content, the list displayed within the learner interface;
(ii) facilitate selection of at least one of the relevant experts;
(iii) present a chat window within the learner interface to facilitate entry of a question to be provided to the relevant expert; and
(e) a link to one or more communities, the one or more communities being related to a particular subject matter and category, the one or more communities being distinct from the at least one study group.

2. The system of claim 1, wherein the learner interface is further configured to facilitate a live video chat session as part of a user engaging with an expert.

3. The system of claim 1, wherein the learner interface is further configured to allow the user to send an email to an expert as part of the user engaging with an expert.

4. A method for enabling a user to access learning content via a single-window learner interface, the method comprising:
providing, to at least one user via a user device connected to a network, access to:
(1) a learning platform comprising a database of learning content, and,
(2) at least one financial system configured to facilitate the purchase of learning content from the database of learning content;
receiving a purchase request from at least one user via at least one user device for learning content available in the database of learning content;
generating, by a computing system, a single-window learner interface comprising:
(a) at least one playback window configured to provide the purchased learning content to the user;
(b) at least one note tab configured to facilitate creation of at least one sticky note by the user, the at least one sticky note comprising a time stamped note linked to specific content within the purchased learning content at the time the note was created;
(c) a link to at least one study group specific to the purchased learning content, the link to the at least one study group enabling the user to access at least one study group specific to the purchased learning content for communication with other users in the at least one study group;
(d) at least one expert tab configured to allow the user to engage with an expert, wherein, responsive to the selection of the expert tab, the learning interface is configured to:
(i) present a list of one or more relevant experts tied to the purchased learning content, the list displayed within the learning interface;
(ii) facilitate selection of at least one of the relevant experts;
(iii) present a chat window within the learner interface to facilitate entry of a question to be provided to the relevant expert; and
(e) a link to one or more communities, the one or more communities being related to a particular subject matter and category, the one or more communities being distinct from the at least one study group;
enabling, through the learner interface:
(1) user interaction with the purchased learning content without regard to time of access , and
(2) user control the pace of learning.

5. The method of claim 4, wherein the learner interface is further configured to present a live video chat session as part of a user engaging with an expert.

6. The method of claim 4, wherein the learner interface is further configured to allow the user to send an email to an expert as part of the user engaging with an expert.

7. A non-transitory computer readable storage medium storing instructions that, when executed by a computer system, cause the computer system to perform the steps comprising:
provide, to a user, access to:
(1) a learning platform comprising a database of learning content, and,
(2) at least one financial system configured to facilitate the purchase of learning content from the database of learning content;
receive a purchase request from at least one user for learning content available in the database of learning content;
generate a single-window learner interface comprising:

(a) at least one playback window configured to provide the purchased learning content to the user;

(b) at least one note tab configured to facilitate creation of at least one sticky note by the user, the at least one sticky note comprising a time stamped note linked to specific content within the purchased learning content at the time the note was created;

(c) a link to at least one study group specific to the purchased learning content, the link to the at least one study group enabling the user to access at least one study group specific to the purchased learning content for communication with other users in the at least one study group;

(d) at least one expert tab configured to allow the user to engage with an expert, wherein, responsive to the selection of the expert tab, the learner interface is configured to:

(i) present a list of one or more relevant experts tied to the purchased learning content, the list displayed within the learner interface;

(ii) facilitate selection of at least one of the relevant experts;

(iii) present a chat window within the learner interface to facilitate entry of a question to be provided to the relevant expert; and (e) a link to one or more communities, the one or more communities being related to a particular subject matter and category, the one or more communities being distinct from the at least one study group; and enable user interaction with the purchased learning content without regard to time of access and user control the pace of learning via the learner interface.

8. The method of claim 4, wherein the learner interface is further configured to present a live video chat session as part of a user engaging with an expert.

9. The method of claim 4, wherein the learner interface is further configured to allow the user to send an email to an expert as part of the user engaging with an expert.

* * * * *